United States Patent
Wang et al.

(10) Patent No.: US 12,285,747 B2
(45) Date of Patent: Apr. 29, 2025

(54) METHOD OF UTILIZING HUMIC ACID TO PREPARE LAYERED HUMIC ACID/MANGANESE OXIDE COMPOSITE CATALYST AND ITS METHOD OF USE THEREOF

(71) Applicant: Harbin Institute of Technology, Heilongjiang (CN)

(72) Inventors: Panpan Wang, Harbin (CN); Han Wang, Harbin (CN); Jun Ma, Harbin (CN); Shiyi Qiu, Harbin (CN); Junda Yi, Harbin (CN)

( * ) Notice: Subject to any disclaimer, the term of this patent is extended or adjusted under 35 U.S.C. 154(b) by 13 days.

(21) Appl. No.: 18/459,263

(22) Filed: Aug. 31, 2023

(65) Prior Publication Data

US 2024/0066512 A1    Feb. 29, 2024

(51) Int. Cl.
*B01J 35/00* (2024.01)
*B01D 43/00* (2006.01)
*B01J 23/34* (2006.01)
*B01J 31/02* (2006.01)
*B01J 37/04* (2006.01)

(52) U.S. Cl.
CPC .............. *B01J 35/19* (2024.01); *B01D 43/00* (2013.01); *B01J 23/34* (2013.01); *B01J 31/0237* (2013.01); *B01J 37/04* (2013.01); *B01D 2255/2073* (2013.01); *B01D 2255/9022* (2013.01); *B01D 2257/60* (2013.01)

(58) Field of Classification Search
CPC ........ B01J 35/19; B01J 23/34; B01J 31/0237; B01J 37/04; B01D 43/00
See application file for complete search history.

(56) References Cited

FOREIGN PATENT DOCUMENTS

| CN | 101696066 A | 4/2010 |
| CN | 102872816 A | 1/2013 |
| CN | 105110449 A | 12/2015 |
| CN | 106140103 A | 11/2016 |
| CN | 110052248 A | 7/2019 |
| CN | 113426471 A | 9/2021 |
| DE | 19641247 A1 | 7/1997 |

*Primary Examiner* — James A Fiorito
(74) *Attorney, Agent, or Firm* — Novoclaims Patent Services LLC; Mei Lin Wong

(57) ABSTRACT

A method of utilizing humic acid to prepare layered humic acid/manganese oxide composite catalyst and its application, the method includes the steps of: adding sodium hypochlorite, manganese salt and humic acid to a water source, stirring and mixing; then introducing into a filter device having a filter material of manganese and a support medium, and generating a layered humic acid/manganese oxide composite catalyst on a surface of the filter material while directing a continuous water flow of the water source into the filter device with a short empty bed contact time for a short time. The catalyst can be used to effectively remove manganese to maintain an effluent with a $Mn^{2+}$ concentration of not more than 20 μg/L and to effectively remove heavy metals such as iron, manganese, arsenic, thallium, molybdenum or lead from the water source under neutral, acidic or alkaline conditions with a removal rate of 95% more.

6 Claims, 7 Drawing Sheets

METHOD OF UTILIZING HUMIC ACID TO PREPARE LAYERED HUMIC ACID/MANGANESE OXIDE COMPOSITE CATALYST AND ITS METHOD OF USE THEREOF

CROSS REFERENCE OF RELATED APPLICATION

This is a non-provisional application which claimed priority of Chinese application number 202211055326.5, filing date Aug. 31, 2022. The contents of these specifications, including any intervening amendments thereto, are incorporated herein by reference.

BACKGROUND OF THE PRESENT INVENTION

Field of Invention

The present invention relates to the field of drinking water purification and wastewater pollution control.

Description of Related Arts

Due to anthropogenic pollution and the dissolution of soil and rock in low redox potential water bodies, manganese is widely distributed in various natural water bodies such as lakes, reservoirs, groundwater, and rivers due to man-made pollution and the dissolution of soil and rocks in water bodies with low redox potential. When the concentration of manganese in the drinking water distribution system exceeds 20 μg/L, it will cause the deposition of manganese in the pipeline. And the deposition of manganese shedding induced by biological and physicochemical effects will lead to secondary excess of yellow water and manganese at the faucet. Manganese deposits can enrich many harmful substances such as heavy metals and disinfection by-products, posing toxicological risks to public health. In addition, long-term excessive intake of manganese will cause irreversible neurotoxic effects on the human body, especially damage children's intelligence and motor systems. The coexistence of heavy metals such as iron and arsenic in surface water and groundwater further aggravates the complexity of manganese pollution. In the case of interactive manganese pollution of surface water and groundwater, deep level manganese removal is a major problem faced by drinking water plants in our country for a long time.

Dosing chlorine dioxide, potassium permanganate, ozone and other strong oxidizing agents is a commonly used manganese removal method in water plants at home and abroad. When there are many natural organic matter in water, the dose of strong oxidant required to oxidize Mn(II) will increase exponentially, and high concentration of chlorine dioxide will produce harmful by-products such as chlorite and chlorate when used, which limits its maximum dosage. On the other hand, the dosage of potassium permanganate and ozone is not easy to control, and excessive dosage will lead to problems such as excessive permanganate in the effluent. Sand filtration manganese removal technology is widely used in drinking water plants around the world. Microbial communities or oxygen can fix free Mn(II) into the filter bed at the multiphase interface of the filter material to achieve the purpose of manganese removal. However, the effluent water quality of enzyme-based biological manganese removal and manganese removal technology based on catalytic oxygen and active manganese oxide is easily affected by water quality factors and process conditions. Also, seasonal changes in water quality and manganese concentration pose great challenges to sand filtration manganese removal technology.

The removal effect of manganese is closely related to the pH, oxygen content, temperature, dissolved organic matter and manganese content of the source water, and other biochemical conditions. The water quality condition of the raw water has a significant influence on the oxidation of manganese. At present, neither the direct oxidation method with enhancer nor the manganese removal process by sand filtration can achieve the goal of deep-level manganese removal with a stable manganese concentration in the effluent below 20 μg/L. In addition, the process of removing manganese from surface water and groundwater is often accompanied by heavy metal pollution such as iron, arsenic, thallium, molybdenum, and lead. Existing manganese removal technologies are difficult to meet the needs of removing various types of heavy metal pollution.

SUMMARY OF THE PRESENT INVENTION

An object of the present invention is to solve the problems that the existing manganese removal technology is difficult to meet the needs of removing various types of heavy metal pollution, the aging cycle is long, the amount of chlorine input is large, the catalytic activity is low, and the effect of removing heavy metals is poor, and to provide a method of utilizing humic acid to prepare layered humic acid/manganese oxide composite catalyst and its method of use thereof.

A method of utilizing humic acid to prepare layered humic acid/manganese oxide composite catalyst includes the following specific steps to complete:
(a) adding sodium hypochlorite, manganese salt and humic acid to a water source, stirring and mixing to obtain a water source containing sodium hypochlorite, manganese and humic acid;
(b) introducing the water source containing sodium hypochlorite, manganese and humic acid into a manganese-loaded filter column, a manganese-loaded filter tank or a manganese-loaded filter pool, and processing dynamic operation, during dynamic operation, generating a layered humic acid/manganese oxide composite catalyst on the surface of the filter material to obtain a filter column, a filter tank or a filter pool having a surface layered humic acid/manganese oxide composite catalyst on a surface of the filter column, the filter tank or the filter pool.

The layered humic acid/manganese oxide composite catalyst removes heavy metals from the water source containing heavy metals under neutral, acidic or alkaline conditions. The water source containing heavy metals is surface water, ground water, low temperature and low turbidity water and sewage; the heavy metal is iron, manganese, arsenic, thallium, molybdenum or lead.

PRINCIPLE OF THE PRESENT INVENTION

1. The diverse active functional group composition of humic acid makes it amphiphilic, showing a strong tendency to interact with metal ions and organic matter in soil and water. Humic acid can interact with various environmental components through coordination and electrostatic attraction, the carboxyl and phenol groups of humic acid can complex with various metal ions in water, and the hydrophobic aliphatic and benzene ring structures can adsorb organic pollutants. Humic acid contains both electron-withdrawing groups (such as quinone groups) and electron-donating groups (such as phenol groups), which can catalyze the degradation of toxic environmental pollutants and play an important role in natural and engineered redox processes.

2. Organic matter-metal oxide complexes are also effective adsorbents for metal ions and organic substances in nature, and have potential effects on the migration, transformation and bioavailability of metal ions and organic pollutants in the environment. However, after metal oxides are combined with organic matters, its physical and chemical properties will change accordingly. Compared with metal oxides, organic/metal oxide composites have stronger adsorption capacity for metal ions and may also improve the catalytic performance of metal oxides.

The advantages of the present invention are as follows:

(1) According to the present invention, the construction process of the filter column, filter tank or filter pond containing the layered humic acid/manganese oxide composite catalyst on the surface is simple and easy. A layered humic acid/manganese oxide composite catalyst can be formed on the surface of the filter material at the beginning of operation, and the actual chlorine dosage is less than the theoretical stoichiometric chlorine dosage (1.3 mg available chlorine/mgMn$^{2+}$), and the rate of oxidation of Mn$^{2+}$ is still fast under the conditions of weak acidity, weak alkalinity and neutral pH.

(2). The method of the invention can realize fast and stable manganese removal, and the quality of raw water has little effect on the removal process. Also, the process is simple, and its operation is easy to implement. The method can be used not only in centralized water supply plants, but also as integrated equipment for treating rural groundwater, while the cost is low, and it is convenient to use, thus having broad application prospects in the water treatment industry and having considerable the economic benefits.

(3) The layered humic acid/manganese oxide composite catalyst prepared by the present invention has a removal rate of more than 95% for iron, arsenic, thallium, molybdenum, and lead, and can ensure long-term stable and up to standard effluent.

The layered humic acid/manganese oxide composite catalyst can be obtained by the present invention.

DETAILED DESCRIPTION OF THE PREFERRED EMBODIMENT

Figure 1:
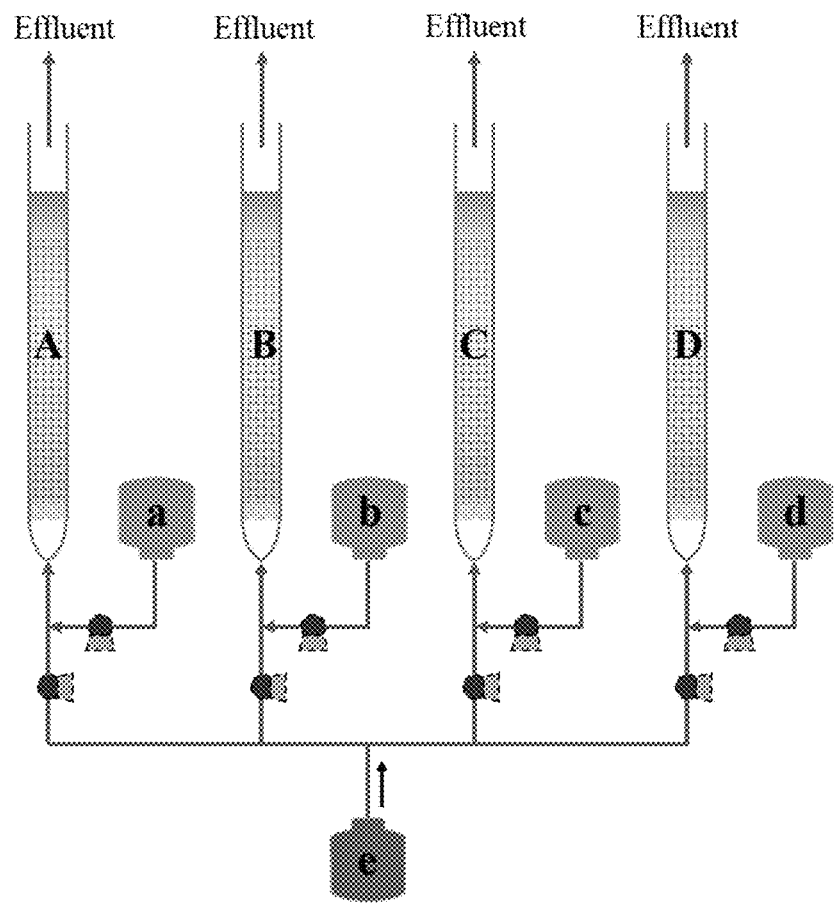
FIG. 1 is a structural schematic diagram of the filter column having a layered humic acid/manganese oxide composite catalyst prepared in Exemplary Embodiment 1 according to the present invention. In the figure, A~D refer to filter columns filled with filter material, a~d refer to water sources containing manganese and humic acid, and e refers to NaClO solution.

The present invention is further described in details below in the preferred embodiments, but it should not be construed as limiting the present invention. Without departing from the essence of the present invention, the modifications and replacements made to the methods, steps or conditions of the present invention all belong to the scope of the present invention.

Preferred Embodiment 1: According to this embodiment, a method of utilizing humic acid to prepare layered humic acid/manganese oxide composite catalyst includes the following steps to complete:
  (a) adding sodium hypochlorite, manganese salt and humic acid to a water source, stirring and mixing to obtain a water source containing sodium hypochlorite, manganese and humic acid;
  (b) introducing the water source containing sodium hypochlorite, manganese and humic acid into a manganese-loaded filter column, a manganese-loaded filter tank or a manganese-loaded filter pool, and processing dynamic operation, during dynamic operation, generating a layered humic acid/manganese oxide composite catalyst on a filter material to obtain a filter column, a filter tank or a filter pool having a layered humic acid/manganese oxide composite catalyst on a surface of the filter column, the filter tank or the filter pool.

In other words, the water source containing sodium hypochlorite, manganese and humic acid is introduced into a manganese-loaded filter column, a manganese-loaded filter tank or a manganese-loaded filter pool, and then a layered humic acid/manganese oxide composite catalyst is generated on a surface of a filter material of the filter column, a filter tank or a filter pool to obtain a filter column, a filter tank or a filter pool having a layered humic acid/manganese oxide composite catalyst on a surface.

Preferred Embodiment 2: The difference between this embodiment and the Preferred Embodiment 1 is that: in step (a), the manganese salt is selected from the group consisting one or more of manganese sulfate, manganese nitrate and manganese chloride; the water source is deionized water or sewage; and a stirring and mixing time is 0.5 min~10 min. Other steps are the same as in the preferred embodiment 1.

Preferred Embodiment 3" The difference between this embodiment and the Preferred Embodiment 1 or 2 is that: in step (a), in the water source containing sodium hypochlorite, manganese and humic acid, a concentration of manganese ions is 0.005 mg/L~50 mg/L, a concentration of humic acid is 0.1 mg/L~20 mg/L, and a concentration of sodium hypochlorite is 0.01 mg/L~10 mg/L. Other steps are the same as in the Preferred Embodiment 1 or 2.

Preferred Embodiment 4: The difference between this embodiment and one of the Preferred Embodiments 1-3 is that: in step (b), an empty bed contact time of the manganese-loaded filter column, manganese-loaded filter tank or manganese-loaded filter pool is 5 minutes~60 minutes, and the dynamic operation is processed for 10 minutes or more to dynamically generate the layered humic acid/manganese oxide composite catalyst on the surface of the filter material. Other steps are the same as in the Preferred Embodiments 1-3.

Preferred Embodiment 5: The difference between this embodiment and one of the Preferred Embodiments 1-4 is that: in step (b), the manganese-loaded filter column, the manganese-loaded filter tank or the manganese-loaded filter pool is manufactured by the following manufacturing process:
  (b.1) Adsorption:
    under the condition of reciprocating oscillation, immersing filter material particles of zeolite, quartz sand or activated carbon in a divalent manganese solution for $Mn^{2+}$ adsorption; and then pouring out the divalent manganese solution after the adsorption is completed to obtain filter material particles adsorbed with $Mn^{2+}$;
  (b.2) Preparation of Manganese-Loaded Filter Material Particles:
    immersing the filter material particles adsorbed with $Mn^{2+}$ in a mixed solution of potassium permanganate and alkali for a second adsorption, after the second adsorption is completed, rinsing and then natural drying to obtain manganese-loaded filter material particles;
  (b.3) Construction of the Manganese-Loaded Filter Column, the Manganese-Loaded Filter Tank or the Manganese-Loaded Filter Pool:
    utilizing the manganese-loaded filter material particles as a filter material; and utilizing one or more combination of quartz sand, pebbles and manganese sand as a supporting layer to construct the manganese-loaded filter column, the manganese-loaded filter tank or the manganese-loaded filter pool. Other steps are the same as in the Preferred Embodiments 1-4.

Preferred Embodiment 6: The difference between this embodiment and one of the Preferred Embodiments 1-5 is that: in step (b.1), a particle size of the filter material particles is 0.01 mm~10 mm; and the reciprocating oscillation has a speed of 50 rpm~500 rpm and an amplitude of 10 mm~30 mm. Other steps are the same as in the Preferred Embodiments 1-5.

Preferred Embodiment 7: The difference between this embodiment and one of the Preferred Embodiments 1-6 is that: in step (b.1), the divalent manganese solution is selected from the group consisting of one or more of manganese sulfate solution, manganese nitrate solution and manganese chloride solution; a concentration of the divalent manganese solution is 0.01 mol/L~1 mol/L; and an adsorption time for $Mn^{2+}$ adsorption is 0.1 h~72 h. Other steps are the same as in the Preferred Embodiments 1-6.

Preferred Embodiment 8: The difference between this embodiment and one of the Preferred Embodiments 1-7 is that: in step (b.2), a concentration of the potassium permanganate is 0.01 mol/L~1 mol/L, and a concentration of the alkali is 0.01 mol/L~1 mol/L in the mixed solution of potassium permanganate and alkali, the alkali is selected from the group consisting one or more of sodium hydroxide, potassium hydroxide, sodium bicarbonate and potassium bicarbonate, an adsorption time for the second adsorption is 0.1 h~72 h, a temperature for natural drying is 17° C.~30° C., and the rinsing comprises the steps of washing the filter material particles 3 to 5 times by using a solvent selected from the group consisting of deionized water, ultrapure water and distilled water. Other steps are the same as in the Preferred Embodiments 1-7.

Preferred Embodiment 9: The difference between this embodiment and the Preferred Embodiments 1-8 is that: the layered humic acid/manganese oxide composite catalyst is arranged for removing heavy metals from the water source containing heavy metals under neutral, acidic or alkaline condition, wherein the water source containing heavy metals is selected from the group consisting of surface water, ground water, low temperature and low turbidity water and sewage, the heavy metal is one or more of iron, manganese, arsenic, thallium, molybdenum and lead. Other steps are the same as in the Preferred Embodiments 1-8.

Preferred Embodiment 10: The difference between this embodiment and the Preferred Embodiments 1-9 is that: a method of removing heavy metals from the water source containing heavy metals under neutral, acidic or alkaline condition by the layered humic acid/manganese oxide composite catalyst comprises the steps of:

adding sodium hypochlorite to the water source containing heavy metals; stirring and mixing uniformly; directing the water source containing heavy metals and sodium hypochlorite to flow into the filter column, the filter tank or the filter pool having the layered humic acid/manganese oxide composite catalyst; and processing dynamic operation to obtain water with heavy metals removed; a quantity of the sodium hypochlorite being added is 0.01 mg/L~10 mg/L, and a flow direction of the water source containing heavy metals to flow into the filter column, the filter tank or the filter pool is an upward flow direction or a downward flow direction. Other steps are the same as in the Preferred Embodiments 1-9.

The present invention will be described in detail below in conjunction with the accompanying drawings and embodiments.

Exemplary Embodiment 1

A method of utilizing humic acid to prepare layered humic acid/manganese oxide composite catalyst includes the following steps to complete:

Step (a) adding sodium hypochlorite, manganese chloride and humic acid to tap water as a water source, stirring and mixing for 1 min to obtain tap water (the water source) containing sodium hypochlorite, manganese chloride and humic acid.

In the tap water containing sodium hypochlorite, manganese chloride and humic acid in the above step (a), a concentration of $Mn^{2+}$ is 1 mg/L, a concentration of sodium hypochlorite solution is 1.3 mg/L, and a concentration of humic acid is 0 mg/L, 0.5 mg/L, 2 mg/L or 10 mg/L respectively.

Step (b) introducing the water source containing sodium hypochlorite, manganese chloride and humic acid into a manganese-loaded filter column, and carrying out dynamic operation. During dynamic operation, dynamically generating a layered humic acid/manganese oxide composite catalyst on the surface of the filter column to obtain a filter column having a layered humic acid/manganese oxide composite catalyst on the surface.

In the above step (b), an empty bed contact time of the manganese-loaded filter column is 7.3 min, and the layered humic acid/manganese oxide composite catalyst is dynamically generated on the surface of the filter material after dynamic operation for 10 minutes.

In the above step (b), a preparation method of the manganese-loaded filter column is completed by the following steps:

Step (b.1) Adsorption

Under the condition of reciprocating oscillation, immerse zeolite particles in a manganese sulfate solution having a concentration of 0.3 mol/L for $Mn^{2+}$ adsorption. The adsorption time is 12 hours. After the adsorption is completed, pour off the manganese sulfate solution to obtain filter material particles adsorbed with $Mn^{2+}$.

In the above step (b.1), the particle diameter of the zeolite particle is 0.8 mm~1.2 mm; the speed of reciprocating oscillation is 200 rpm, and the amplitude is 20 mm.

(b.2) Preparation of Manganese-Loaded Filter Material Particles:

Immerse the filter material particles adsorbed with $Mn^{2+}$ in a mixed solution of potassium permanganate and alkali to carry out a second adsorption process for 12 hours. After the adsorption is completed, rinse with deionized water for 5 times and then dry naturally at 25° C. to obtain manganese-loaded filter material particles. (In other words, this step refers to rinsing with deionized water for 5 times and drying at 25° C. after the adsorption is completed to obtained the manganese-loaded filter material particles.)

In the above step (b.2), in the mixed solution of potassium permanganate and alkali, the concentration of potassium permanganate is 0.2 mol/L, and the concentration of alkali is 0.4 mol/L, and the alkali is sodium hydroxide.

(b.3) Construction of the Manganese-Loaded Filter Column:

Utilize the manganese-loaded filter material particles as a filter material; and utilize quartz sand as a supporting layer to construct the manganese-loaded filter column.

FIG. 1 is a structural schematic diagram of the filter column having a layered humic acid/manganese oxide composite catalyst prepared in Exemplary Embodiment 1. In the figure, A~D refer to filter columns filled with filter material, a~d refer to water source containing manganese and humic acid, and e refers to NaClO solution.

Figure 2:
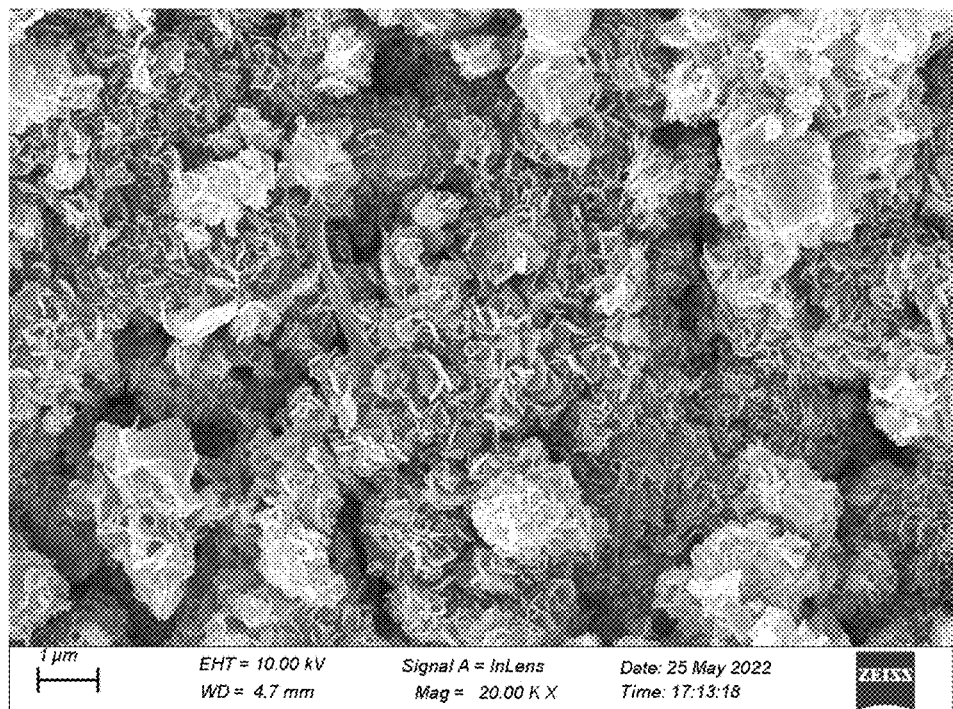
FIG. 2 is a microcosmic topography of a dynamically generated filter material with manganese oxide on the surface, wherein a concentration of Mn$^{2+}$ is 1 mg/L, and a concentration of humic acid is 0 mg/L in the influent water of the manganese-loaded filter column in step (b) of Exemplary Embodiment 1 of the present invention.

FIG. 2 is a microcosmic topography of a dynamically generated filter material with manganese oxide on the surface by using a $Mn^{2+}$ concentration of 1 mg/L, and a humic acid concentration of 0 mg/L in the influent water of the manganese-loaded filter column in step (b) of Exemplary Embodiment 1 of the present invention.

Figure 3:
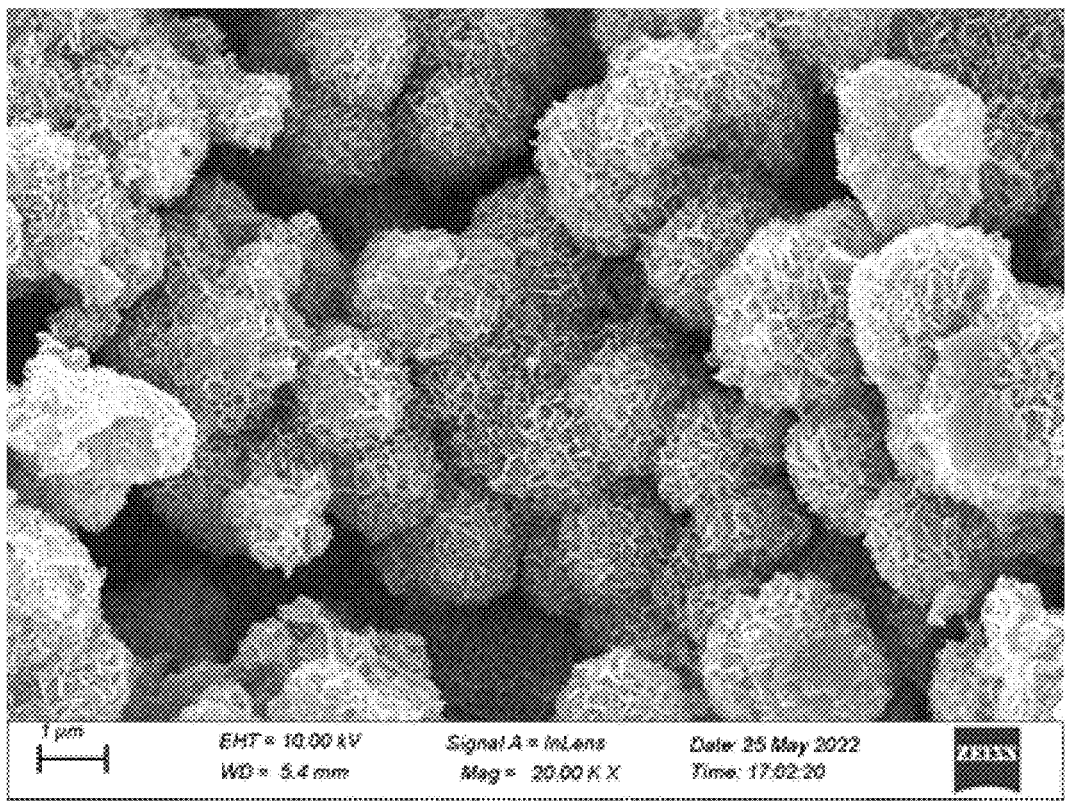
FIG. 3 is a microcosmic topography of a dynamically generated filter material with layered humic acid/manganese oxide composite catalyst on the surface, wherein a concentration of Mn$^{2+}$ is 1 mg/L, and a concentration of humic acid is 0.5 mg/L in the influent water of the manganese-loaded filter column in step (b) of Exemplary Embodiment 1 of the present invention.

FIG. 3 is a microcosmic topography of a dynamically generated filter material with a layered humic acid/manganese oxide composite catalyst on the surface by using a $Mn^{2+}$ concentration of 1 mg/L, and a humic acid concentration of 0.5 mg/L in the influent water of the manganese-loaded filter column in step (b) of Exemplary Embodiment 1 of the present invention.

Figure 4:
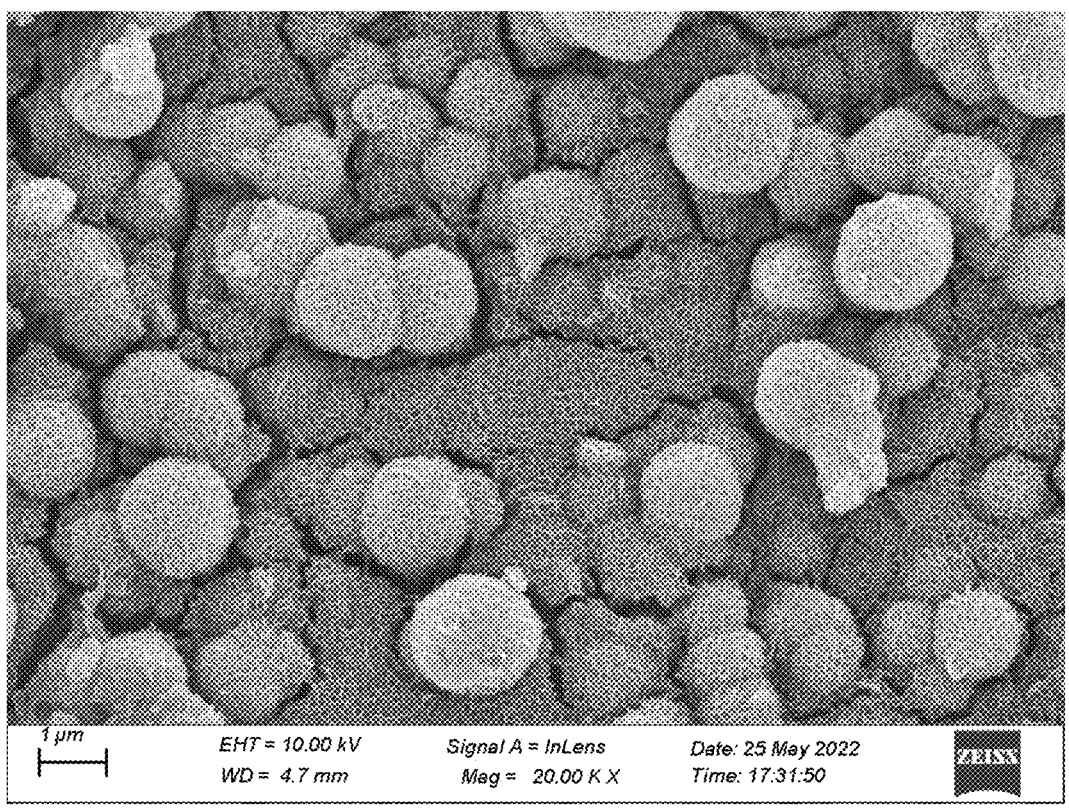
FIG. 4 is a microcosmic topography of a dynamically generated filter material with layered humic acid/manganese oxide composite catalyst on the surface, wherein a concentration of Mn$^{2+}$ is 1 mg/L, and a concentration of humic acid is 2 mg/L in the influent water of the manganese-loaded filter column in step (b) of Exemplary Embodiment 1 of the present invention.

FIG. 4 is a microcosmic topography of a dynamically generated filter material with layered humic acid/manganese oxide composite catalyst on the surface by using a $Mn^{2+}$ concentration of 1 mg/L, and a humic acid concentration of 2 mg/L in the influent water of the manganese-loaded filter column in step (b) of Exemplary Embodiment 1 of the present invention.

Figure 5:
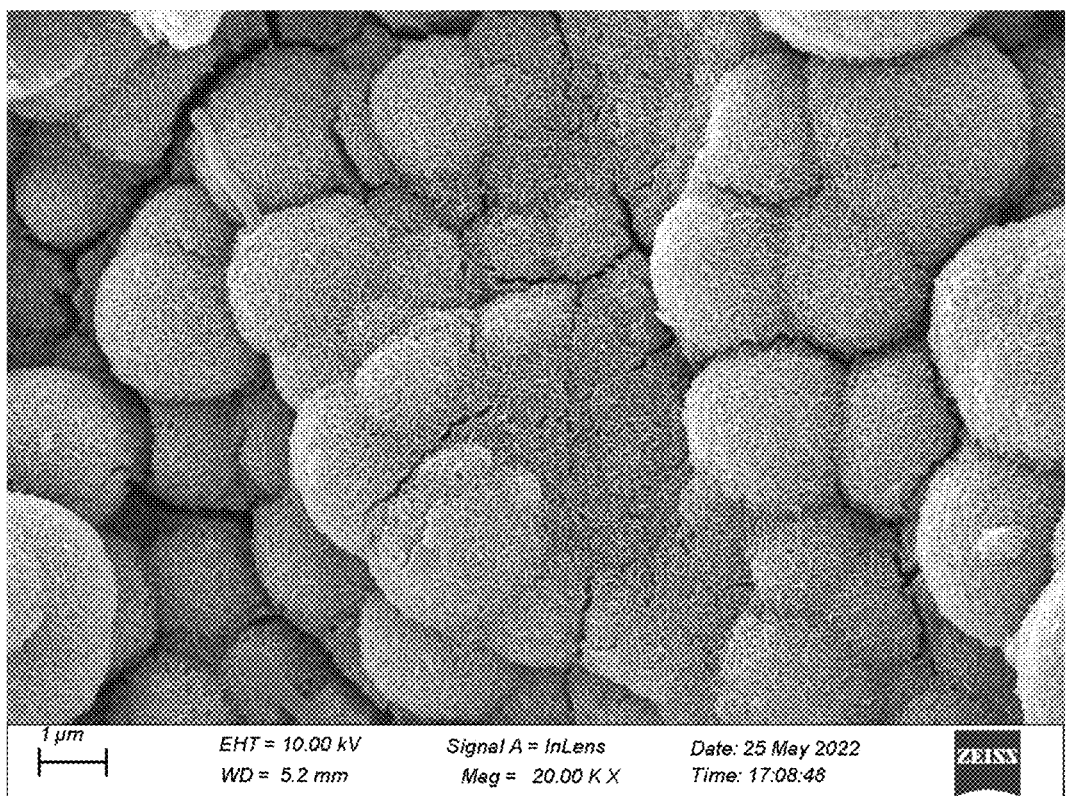
FIG. 5 is a microcosmic topography of a dynamically generated filter material with layered humic acid/manganese oxide composite catalyst on the surface, wherein a concentration of Mn$^{2+}$ is 1 mg/L, and a concentration of humic acid is 10 mg/L in the influent water of the manganese-loaded filter column in step (b) of Exemplary Embodiment 1 of the present invention.

FIG. 5 is a microcosmic topography of a dynamically generated filter material with layered humic acid/manganese oxide composite catalyst on the surface by using a $Mn^{2+}$ concentration of 1 mg/L, and a humic acid concentration of 10 mg/L in the influent water of the manganese-loaded filter column in step (b) of Exemplary Embodiment 1 of the present invention.

It can be seen from FIGS. 2-5 of the drawings that: humic acid significantly changed the morphology of manganese oxides on the surface of the manganese-loaded filter material after being oxidized and filtered by sodium hypochlorite for 10 minutes. A layered humic acid/manganese oxide composite catalyst is dynamically generated on the surface of the filter material. After adding humic acid, many spherical manganese oxides of different sizes are produced on the surface of the filter material. The manganese oxides produced under the condition of the presence of only divalent manganese and free chlorine are significantly different. As the concentration of humic acid in the influent water increases, the degree of disorder of the nascent manganese oxides increases, and its growth trend spreads to the surroundings, and the nascent manganese oxides no longer grow along a fixed direction along the sheet.

Exemplary Embodiment 2

Under the condition of chlorine dosing, the filter column having the layered humic acid/manganese oxide composite catalyst on the surface removes dissolved manganese in neutral water according to the following steps: direct neutral manganese-containing water source to enter the filter column having the surface layered humic acid/manganese oxide composite catalyst obtained in step (b) of Exemplary Embodiment 1. Add sodium hypochlorite to neutral water containing manganese. Stir uniformly and react for 3 minutes to obtain water having $Mn^{2+}$ removed. The manganese-containing water source is tap water with a $Mn^{2+}$ concentration of 1 mg/L; the dosage of the sodium hypochlorite is 2 mg/L; and the manganese-containing water source enters the filter column in a downward flow.

Figure 6:
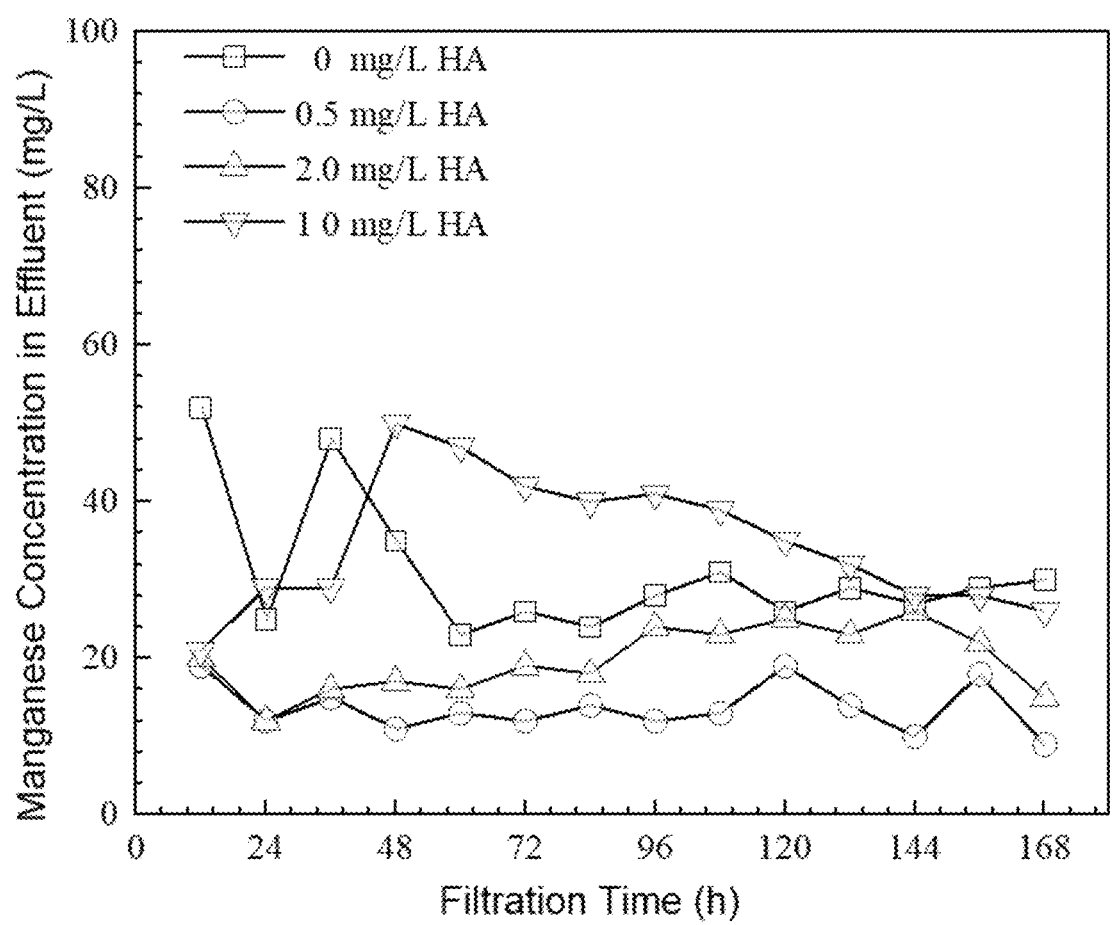
FIG. 6 illustrates the effect of the filter column having layered humic acid/manganese oxide composite catalyst on the surface prepared under different concentrations of humic acid according to Exemplary Embodiment 1 in removing dissolved manganese in water under the condition of chlorine dosing according to Exemplary Embodiment 2.

FIG. 6 illustrates the effect of the filter column having layered humic acid/manganese oxide composite catalyst on the surface prepared under different concentrations of humic acid in Exemplary Embodiment 1 in removing dissolved manganese in water under the condition of chlorine dosing according to Exemplary Embodiment 2.

It can be seen from FIG. 6 that the concentration of $Mn^{2+}$ in the effluent of the filter column having manganese oxide composite catalyst on the surface prepared with 0 mg/L HA fluctuate greatly in the first 48 hours of filtration, and reach a maximum of 53 μg/L. After 60 hours of filtration, the effluent quality becomes stable, but the concentration of $Mn^{2+}$ in the effluent is always higher than 20 μg/L at the filtration time of 168 hours. On the other hand, the concentration of $Mn^{2+}$ in the effluent of the filter column having layered humic acid/manganese oxide composite catalyst dynamically generated on the surface prepared with the water source having a $Mn^{2+}$ concentration of 1 mg/L and a humic acid concentration of 0.5 mg/L is always lower than 20 μg/L. This shows that the filter column having the layered humic acid/manganese oxide composite catalyst has a more efficient oxidation removal ability.

Figure 7:
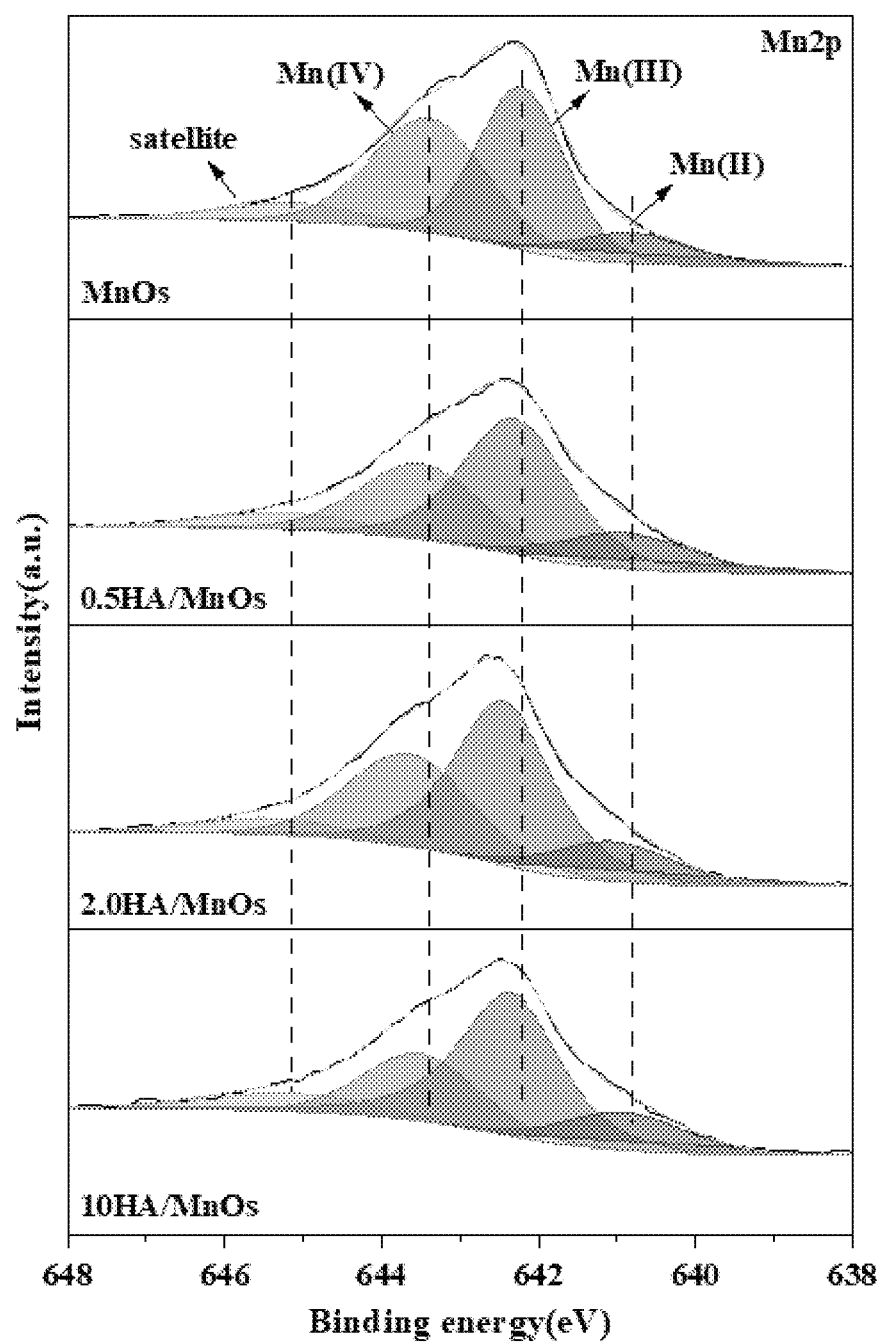
FIG. 7 illustrates the XPSMn2p3/2 diagram of zeolite with layered humic acid/manganese oxide composite catalyst formed on the surface obtained from step (b) of Exemplary Embodiment 1 of the present invention. In the figure, MnOs refer to the filter material particles dynamically generated by using the influent water with a Mn$^{2+}$ concentration of 1 mg/L and a humic acid concentration of 0 mg/L in step (a) of Exemplary Embodiment 1. In the figure, 0.5HA/MnOs refer to the filter material particles dynamically generated by using the influent water with a Mn$^{2+}$ concentration of 1 mg/L and a humic acid concentration of 0.5 mg/L in step (a) of Exemplary Embodiment 1. In the figure, 2HA/MnOs refer to the filter material particles dynamically generated by using the influent water with a Mn$^{2+}$ concentration of 1 mg/L and a humic acid concentration of 2 mg/L in step (a) of Exemplary Embodiment 1. In the figure, 10HA/MnOs refer to the filter material particles dynamically generated by using the influent water with a Mn$^{2+}$ concentration of 1 mg/L and a humic acid concentration of 10 mg/L in step (a) of Exemplary Embodiment 1.

FIG. 7 illustrates the XPSMn2p3/2 diagram of zeolite with layered humic acid/manganese oxide composite catalyst formed on the surface obtained from step (b) of Exemplary Embodiment 1. In the figure, MnOs refer to the filter material particles dynamically generated by using the influent water with a $Mn^{2+}$ concentration of 1 mg/L and a humic acid concentration of 0 mg/L in step (a) of Exemplary Embodiment 1. In the figure, 0.5HA/MnOs refer to the filter material particles dynamically generated by using the influent water with a $Mn^{2+}$ concentration of 1 mg/L and a humic acid concentration of 0.5 mg/L in step (a) of Exemplary Embodiment 1. In the figure, 2HA/MnOs refer to the filter material particles dynamically generated by using the influent with a $Mn^{2+}$ concentration of 1 mg/L and a humic acid concentration of 2 mg/L in step (a) of Exemplary Embodiment 1. In the figure, 10HA/MnOs refer to the filter material particles dynamically generated by using the influent with a $Mn^{2+}$ concentration of 1 mg/L and a humic acid concentration of 10 mg/L in step (a) of Exemplary Embodiment 1.

Figure 8:
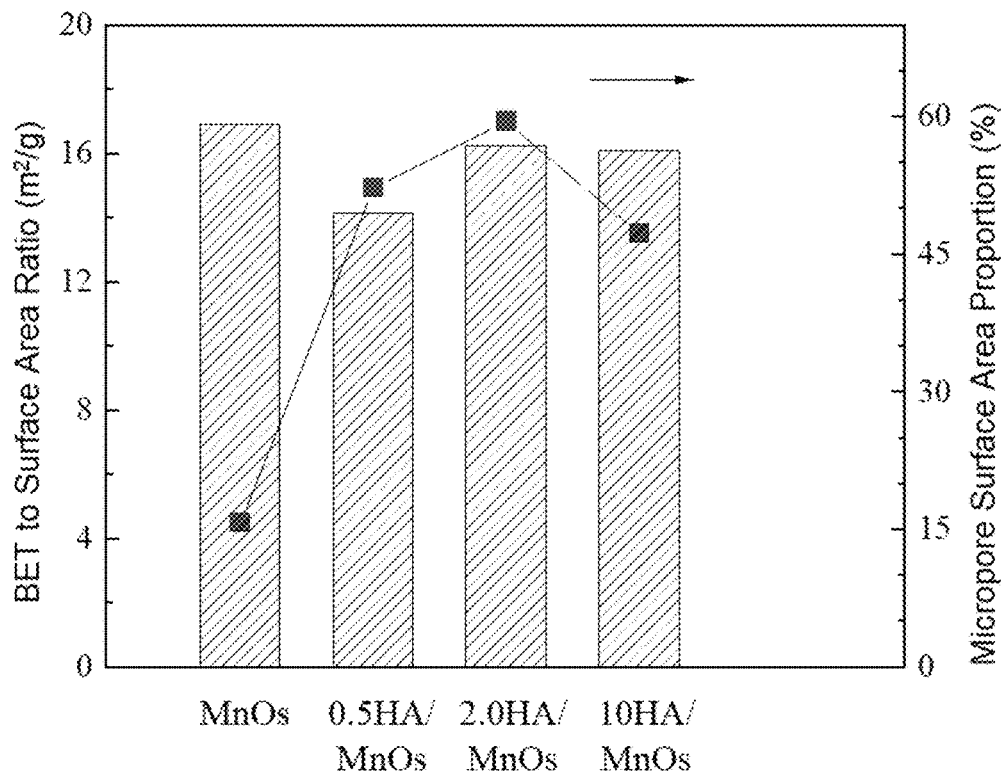
FIG. 8 illustrates the ratio of BET to surface area and the percentage of micropore surface area of the layered humic acid/manganese oxide composite catalyst on the surface obtained from step (b) of Exemplary Embodiment 1. In the figure, MnOs refer to the filter material particles dynamically generated by using the influent water with a Mn$^{2+}$ concentration of 1 mg/L and a humic acid concentration of 0 mg/L in step (a) of Exemplary Embodiment 1. In the figure, 0.5HA/MnOs refer to the filter material particles dynamically generated by using the influent water with a Mn$^{2+}$ concentration of 1 mg/L and a humic acid concentration of 0.5 mg/L in step (a) of Exemplary Embodiment 1. In the figure, 2HA/MnOs refer to the filter material particles dynamically generated by using the influent water with a Mn$^{2+}$ concentration of 1 mg/L and a humic acid concentration of 2 mg/L in step (a) of Exemplary Embodiment 1. In the figure, 10HA/MnOs refer to the filter material particles dynamically generated by using the influent water with a Mn$^{2+}$ concentration of 1 mg/L and a humic acid concentration of 10 mg/L in step (a) of Exemplary Embodiment 1.

FIG. 8 illustrates the ratio of BET to surface area and the percentage of micropore surface area of the layered humic acid/manganese oxide composite catalyst on the surface obtained from step (b) of Exemplary Embodiment 1. In the figure, MnOs refer to the filter material particles dynamically generated by using the influent water with a $Mn^{2+}$ concentration of 1 mg/L and a humic acid concentration of 0 mg/L in step (a) of Exemplary Embodiment 1. In the figure, 0.5HA/MnOs refer to the filter material particles dynamically generated by using the influent water with a $Mn^{2+}$ concentration of 1 mg/L and a humic acid concentration of 0.5 mg/L in step (a) of Exemplary Embodiment 1. In the figure, 2HA/MnOs refer to the filter material particles dynamically generated by using the influent with a $Mn^{2+}$ concentration of 1 mg/L and a humic acid concentration of 2 mg/L in step (a) of Exemplary Embodiment 1. In the figure, 10HA/MnOs refer to the filter material particles dynamically generated by using the influent with a $Mn^{2+}$ concentration of 1 mg/L and a humic acid concentration of 10 mg/L in step (a) of Exemplary Embodiment 1.

The characterization results in FIGS. 7-8 prove that according to the proportion of each component, the filter material with layered humic acid/manganese oxide composite catalyst on the surface has a higher content of Mn(III) active components, the proportion of micropores on the surface is higher, and the active sites are mostly distributed on the cross-section of the nano-layered manganese catalyst; the filter material with layered humic acid/manganese oxide composite catalyst on the surface can more efficiently catalyze the chlorine oxidation of $Mn^{2+}$ under neutral conditions, and can achieve rapid and stable manganese removal.

Exemplary Embodiment 3

Under the condition of chlorine dosing, the filter column having the layered humic acid/manganese oxide composite catalyst on the surface removes dissolved manganese in weakly acidic water according to the following steps: direct weakly acidic manganese-containing water source to enter the filter column having the surface layered humic acid/manganese oxide composite catalyst obtained in step (b) of Exemplary Embodiment 1. Add sodium hypochlorite to weakly acidic manganese-containing water. Stir uniformly and react for 10 minutes to obtain water having $Mn^{2+}$ removed. The manganese-containing water source is tap water with a $Mn^{2+}$ concentration of 1 mg/L; the pH of the manganese-containing water source is adjusted to 6 with dilute sulfuric acid; the dosage of the sodium hypochlorite is 1.3 mg/L; and the manganese-containing water source enters the filter column in a downward flow.

Figure 9:
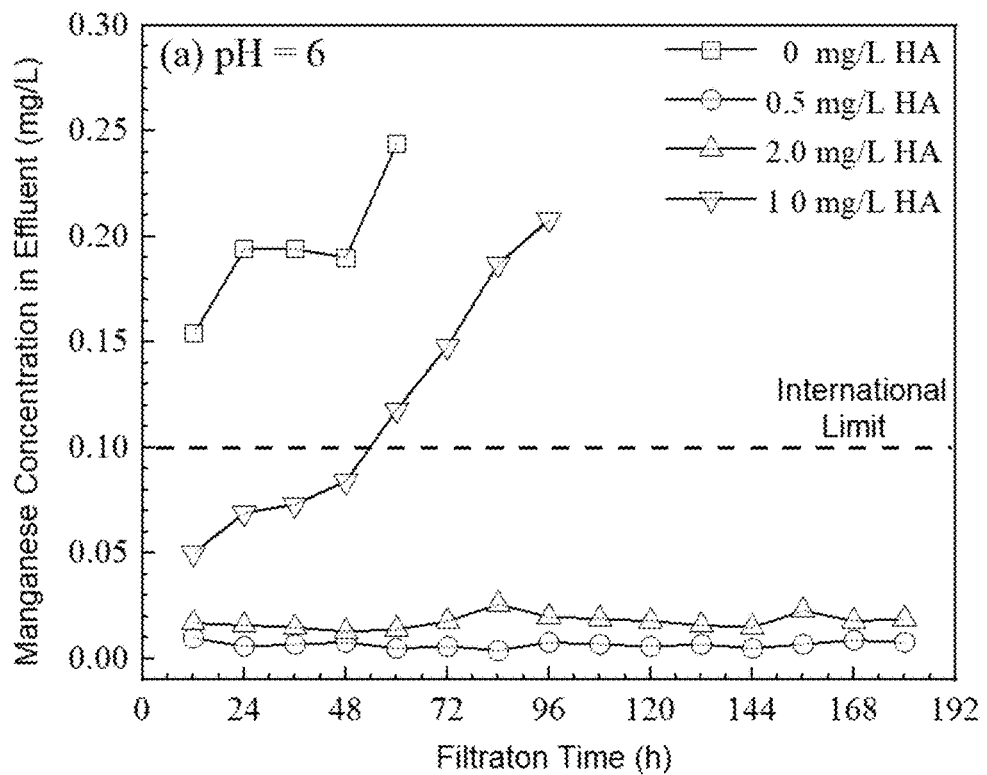
FIG. 9 illustrates the effect of removing dissolved manganese in weakly acidic water under the condition of chlorine dosing by using the filter column having layered humic acid/manganese oxide composite catalyst on the surface prepared under different concentrations of humic acid in Exemplary Embodiment 1 according to Exemplary Embodiment 3.

FIG. 9 illustrates the effect of the filter column having layered humic acid/manganese oxide composite catalyst on the surface prepared under different concentrations of humic acid in Exemplary Embodiment 1 in removing dissolved manganese in weakly acidic water under the condition of chlorine dosing according to Exemplary Embodiment 3.

It can be seen from FIG. 9 that the $Mn^{2+}$ concentration in the effluent of the manganese oxide modified filter column exceeded the standard at 12th hour of filtration, and the effluent concentration show an upward trend in the first 60 hours of filtration. On the other hand, the concentration of $Mn^{2+}$ in the effluent of the filter column having layered humic acid/manganese oxide composite catalyst filter material dynamically generated on the surface prepared with the water source having a $Mn^{2+}$ concentration of 1 mg/L and a humic acid concentration of 0.5 mg/L is always lower than 20 μg/L. The concentration of $Mn^{2+}$ in the effluent of the filter column having layered humic acid/manganese oxide composite catalyst filter material dynamically generated on the surface prepared with the water source having a $Mn^{2+}$ concentration of 1 mg/L and a humic acid concentration of 2 mg/L is always about 20 μg/L. This shows that the layered humic acid/manganese oxide composite catalyst has a more efficient oxidation removal ability under weakly acidic condition and can achieve rapid and stable manganese removal.

Exemplary Embodiment 4

Under the condition of chlorine dosing, the filter column having the layered humic acid/manganese oxide composite catalyst on the surface removes dissolved manganese in weakly alkaline water according to the following steps: direct weakly alkaline manganese-containing water source to enter the filter column having the surface layered humic acid/manganese oxide composite catalyst obtained in step (b) of Exemplary Embodiment 1. Add sodium hypochlorite to the weakly alkaline manganese-containing water. Stir uniformly and react for 10 minutes to obtain water having $Mn^{2+}$ removed. The manganese-containing water source is tap water with a $Mn^{2+}$ concentration of 1 mg/L; the pH of the manganese-containing water source is adjusted to 8.3 with sodium hydroxide; the dosage of the sodium hypochlorite is 1.3 mg/L; and the manganese-containing water source enters the filter column in a downward flow.

Figure 10:
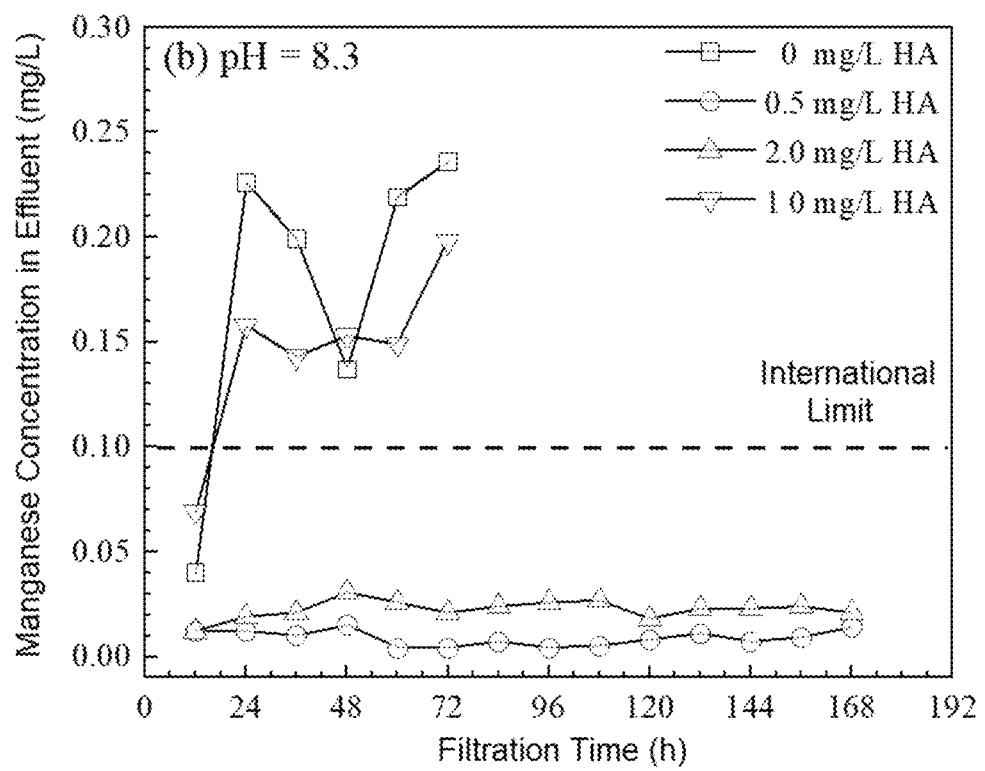
FIG. 10 illustrates the effect of removing dissolved manganese in weakly alkaline water under the condition of chlorine dosing by using the filter column having layered humic acid/manganese oxide composite catalyst on the surface prepared under different concentrations of humic acid in Exemplary Embodiment 1 according to Exemplary Embodiment 4.

FIG. 10 illustrates the effect removing dissolved manganese in weakly alkaline water under the condition of chlorine dosing according to Exemplary Embodiment 4 by using the filter column having layered humic acid/manganese oxide composite catalyst on the surface prepared under different concentrations of humic acid in Exemplary Embodiment 1.

It can be seen from FIG. 10 that the $Mn^{2+}$ concentration in the effluent of the manganese oxide modified filter column exceeded the standard at 12th hour of filtration, and the effluent concentration shows an upward trend in the first 72 hours of filtration. On the other hand, the concentration of $Mn^{2+}$ in the effluent of the filter column having layered humic acid/manganese oxide composite catalyst filter material dynamically generated on the surface prepared by the influent water having a $Mn^{2+}$ concentration of 1 mg/L and a humic acid concentration of 0.5 mg/L according to Exemplary Embodiment 1 is always lower than 20 μg/L. The concentration of $Mn^{2+}$ in the effluent of the filter column having layered humic acid/manganese oxide composite catalyst filter material dynamically generated on the surface prepared by the influent water having a $Mn^{2+}$ concentration of 1 mg/L and a humic acid concentration of 2 mg/L is always about 20 μg/L. This shows that the filter material having the layered humic acid/manganese oxide composite catalyst has a more efficient oxidation removal ability under weakly alkaline condition and can achieve rapid and stable manganese removal.

Exemplary Embodiment 5

Figure 11:
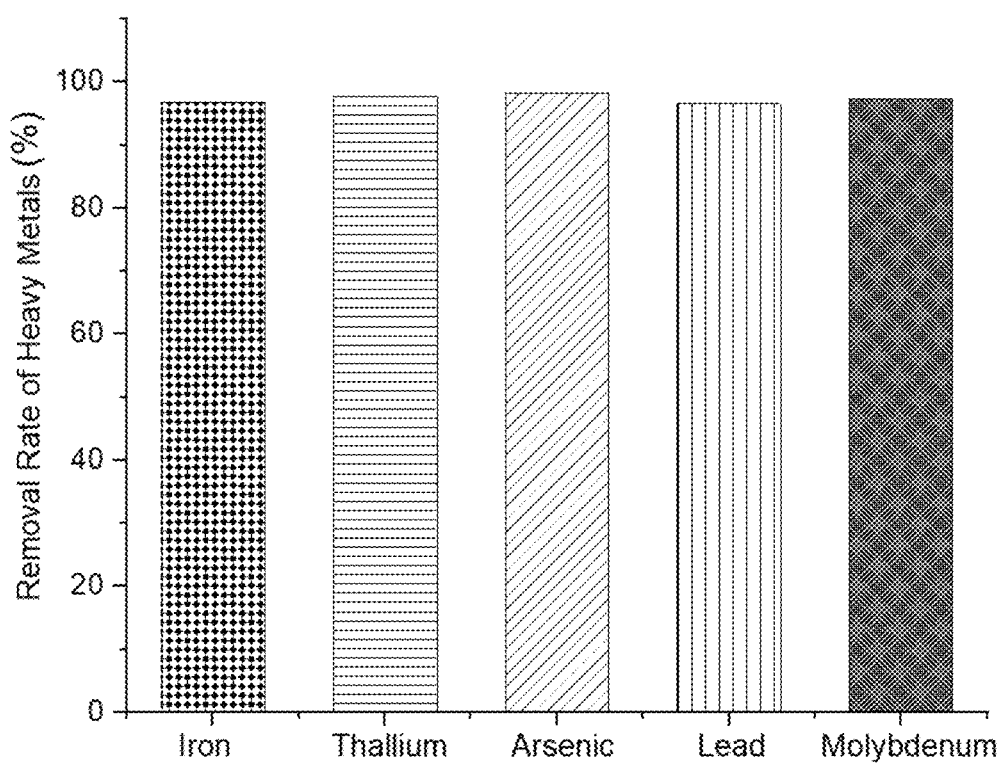
FIG. 11 illustrates the effect of removing heavy metals in water by using the filter column with a layered humic acid/manganese oxide composite catalyst on the surface. prepared in Exemplary Embodiment 1.

The method of removing heavy metals in water under the condition of chlorine dosing by using the filter column having the surface layered humic acid/manganese oxide composite catalyst on the surface prepared in Exemplary Embodiment 1 has the following steps:

Direct water source containing heavy metals to enter the filter column having the surface layered humic acid/manganese oxide composite catalyst. Add sodium hypochlorite to the water source having heavy metals. Stir uniformly and react for 0-150 minutes to obtain water having heavy metals removed, which is shown in FIG. 11. In the water containing heavy metals, the concentration of iron is 1 mg/L, the concentration of arsenic is 0.06 mg/L, the concentration of thallium is 0.001 mg/L, the concentration of molybdenum is 0.2 mg/L, and the concentration of lead is 0.05 mg/L. The dosage of the sodium hypochlorite is 1.3 mg/L.

The water source containing heavy metals enters the filter column having layered humic acid/manganese oxide composite catalyst on the surface in a downward flow direction.

FIG. 11 illustrates the effect of removing heavy metals in water by using the filter column having layered humic acid/manganese oxide composite catalyst on the surface prepared in Exemplary Embodiment 1.

It can be seen from FIG. 11 that according to Exemplary Embodiment 5, the removal rate of iron, arsenic, thallium, molybdenum, and lead is 95% and above, and it can ensure that the effluent reaches the standard in a long-term and stable manner.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of preparing layered humic acid/manganese oxide composite catalyst comprises the following steps:
   (a) adding sodium hypochlorite, manganese salt and humic acid to a water source, stirring and mixing to obtain a water source containing sodium hypochlorite, manganese and humic acid;
   in step (a), in the water source containing sodium hypochlorite, manganese and humic acid, a concentration of manganese ions is 0.005 mg/L-50 mg/L, a concentration of humic acid is 0.1 mg/L-20 mg/L, and a concentration of sodium hypochlorite is 0.01 mg/L-10 mg/L,
   (b) introducing the water source containing sodium hypochlorite, manganese and humic acid into a manganese-loaded filter column, a manganese-loaded filter tank or a manganese-loaded filter pool, wherein an empty bed contact time of the manganese-loaded filter column, manganese-loaded filter tank or manganese-loaded filter pool is 5 minutes-60 minutes; and processing operation for 10 minutes or more, during operation, generating a layered humic acid/manganese oxide composite catalyst on a surface of a filter material to obtain a filter column, a filter tank or a filter pool having a layered humic acid/manganese oxide composite catalyst on a surface of the filter column, the filter tank or the filter pool,
   wherein the layered humic acid/manganese oxide composite catalyst is used to remove heavy metals from a water source containing heavy metals under neutral, acidic or alkaline condition, the water source containing heavy metals is selected from the group consisting of surface water, ground water, low temperature and low turbidity water and sewage, the heavy metals are on more of iron, manganese, arsenic, thallium, molybdenum and lead.

2. The method of preparing layered humic acid/manganese oxide composite catalyst according to claim 1, characterized in that, in step (a), the manganese salt is selected from the group consisting one or more of manganese sulfate, manganese nitrate and manganese chloride; the water source is deionized water or sewage; and a stirring and mixing time is 0.5 min-10 min.

3. The method of preparing layered humic acid/manganese oxide composite catalyst according to claim 1, characterized in that, in step (b), the manganese-loaded filter column, the manganese-loaded filter tank or the manganese-loaded filter pool is manufactured by the following manufacturing process:

(b.1) Adsorption:
under a condition of reciprocating oscillation, immersing filter material particles of zeolite, quartz sand or activated carbon in a divalent manganese solution for $Mn^{2+}$ adsorption; and then pouring out the divalent manganese solution after the adsorption is completed to obtain filter material particles adsorbed with $Mn^{2+}$;

(b.2) Preparation of manganese-loaded filter material particles:
immersing the filter material particles adsorbed with $Mn^{2+}$ in a mixed solution of potassium permanganate and alkali for a second adsorption, after the second adsorption is completed, carrying out rinsing and then natural drying to obtain the manganese-loaded filter material particles;

(b.3) Construction of the manganese-loaded filter column, the manganese-loaded filter tank, or the manganese-loaded filter pool:
utilizing the manganese-loaded filter material particles as a filter material; and utilizing one or more combination of quartz sand, pebbles and manganese sand as a supporting layer to construct the manganese-loaded filter column, the manganese-loaded filter tank, or the manganese-loaded filter pool.

4. The method of preparing layered humic acid/manganese oxide composite catalyst according to claim 3, characterized in that, wherein in step (b.1), a particle size of the filter material particles is 0.01 mm-10 mm; and the reciprocating oscillation has a speed of 50 rpm-500 rpm and an amplitude of 10 mm-30 mm.

5. The method of preparing layered humic acid/manganese oxide composite catalyst according to claim 3, characterized in that, in step (b.1), the divalent manganese solution is selected from the group consisting of one or more of manganese sulfate solution, manganese nitrate solution and manganese chloride solution; a concentration of the divalent manganese solution is 0.01 mol/L-1 mol/L; and an adsorption time for $Mn^{2+}$ adsorption is 0.1 hour-72 hours.

6. The method of preparing layered humic acid/manganese oxide composite catalyst according to claim 3, characterized in that, wherein in step (b.2), a concentration of the potassium permanganate in the mixed solution of potassium permanganate and alkali is 0.01 mol/L-1 mol/L, and a concentration of the alkali in the mixed solution of potassium permanganate and alkali is 0.01 mol/L-1 mol/L, the alkali is selected from the group consisting one or more of sodium hydroxide, potassium hydroxide, sodium bicarbonate and potassium bicarbonate, an adsorption time for the second adsorption is 0.1 h-72 h, a temperature for natural drying is 17° C.-30° C., and the rinsing comprises the steps of washing the filter material particles 3 to 5 times by using a solvent selected from the group consisting of deionized water, purified water and distilled water.

\* \* \* \* \*